(12) United States Patent
Prescott et al.

(10) Patent No.: US 10,266,111 B2
(45) Date of Patent: Apr. 23, 2019

(54) METHOD OF GENERATING WARNINGS USING A VEHICLE MOTOR

(71) Applicant: FORD GLOBAL TECHNOLOGIES, LLC, Dearborn, MI (US)

(72) Inventors: Jennifer Ann Prescott, Northville, MI (US); Jason Meyer Quint, Ann Arbor, MI (US); Andrew Mcmullen, Canton, MI (US); Alexander Petniunas, Canton, MI (US); Spencer Monroe Dinkins, III, Rochester Hills, MI (US); Rafic Jergess, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/604,051

(22) Filed: May 24, 2017

(65) Prior Publication Data

US 2018/0339652 A1 Nov. 29, 2018

(51) Int. Cl.
| | |
|---|---|
| *B60Q 5/00* | (2006.01) |
| *B60N 2/02* | (2006.01) |
| *B60N 2/20* | (2006.01) |
| *B60R 16/03* | (2006.01) |
| *E05F 15/611* | (2015.01) |

(52) U.S. Cl.
CPC .......... *B60Q 5/005* (2013.01); *B60N 2/0232* (2013.01); *B60N 2/20* (2013.01); *B60R 16/03* (2013.01); *E05F 15/611* (2015.01); *E05Y 2201/434* (2013.01); *E05Y 2400/52* (2013.01); *E05Y 2900/532* (2013.01)

(58) Field of Classification Search
None
See application file for complete search history.

(56) References Cited

U.S. PATENT DOCUMENTS

| | | | |
|---|---|---|---|
| 5,563,483 A | * | 10/1996 | Kowall ................. E05B 81/14 318/266 |
| 6,587,038 B2 | | 7/2003 | Cheng et al. |
| 7,005,884 B2 | | 2/2006 | Gunton |

(Continued)

FOREIGN PATENT DOCUMENTS

| | | |
|---|---|---|
| CN | 104106207 A | 10/2014 |
| CN | 105113908 A | 12/2015 |
| CN | 205330369 U | 6/2016 |

OTHER PUBLICATIONS

English machine translation of CN104106207A.
English machine translation of CN105113908A.
English machine translation of CN205330369U.

*Primary Examiner* — Leon Viet Q Nguyen
(74) *Attorney, Agent, or Firm* — Jason Rogers; Vichit Chea; King & Schickli, PLLC

(57) ABSTRACT

A method of generating warnings associated with a vehicle is provided. The method broadly includes the steps of: (a) receiving an indication that a warning relating to operation of an electric motor is appropriate; (b) generating a drive current for the electric motor; (c) superimposing a warning signal onto the drive current; and (d) driving the electric motor with the drive current and the superimposed warning signal such that the electric motor produces the warnings. The warning signal may produce an audio warning, a tactile warning, or a combination thereof.

7 Claims, 6 Drawing Sheets

(56) References Cited

U.S. PATENT DOCUMENTS

| | | | | |
|---|---|---|---|---|
| 7,364,214 B2* | 4/2008 | Park | ................... | B60J 5/101 |
| | | | | 296/76 |
| 9,242,599 B2* | 1/2016 | Shimizu | ................. | B62J 3/00 |
| 2006/0119489 A1* | 6/2006 | Shinada | ................ | B60Q 1/50 |
| | | | | 340/901 |
| 2007/0230716 A1* | 10/2007 | Kobayashi | ........ | B60R 11/0217 |
| | | | | 381/86 |
| 2009/0079435 A1* | 3/2009 | Nakata | .............. | H02M 3/156 |
| | | | | 324/500 |
| 2010/0072772 A1* | 3/2010 | Gamache | ........... | B60N 2/0232 |
| | | | | 296/65.08 |
| 2016/0250968 A1* | 9/2016 | Shirakata | ........... | B60W 50/16 |
| | | | | 340/576 |
| 2017/0229982 A1* | 8/2017 | Takayama | .............. | H02P 6/12 |

* cited by examiner

METHOD OF GENERATING WARNINGS USING A VEHICLE MOTOR

TECHNICAL FIELD

This document relates generally to generating warnings, and more specifically to a method of generating warnings using a motor of a vehicle.

BACKGROUND

It is well known that chimes or warnings are generated in association with certain activities performed by vehicles. For example, sound generators are known to be utilized to alert bystanders when a vehicle is in reverse gear. Similarly, the opening and/or closing of a rear liftgate is often accompanied by a warning from a sound generator or through the vehicle's interior speakers.

While adding a sound generator for the reverse gear or litigate warnings is known, the addition of the device carries additional component and manufacturing costs, including additional wiring, packaging and interfacing. While the utilization of the interior speakers generally avoids these shortcomings associated with adding components to the vehicle, the interior speakers approach is not without its own drawbacks. When the warnings are loud enough to alert bystanders outside of the vehicle of the movement of the liftgate, for instance, the warnings can overwhelm passengers in second and third rows of vehicles.

In addition, there is an inherent delay in generating the warnings. While such delays are traditionally less than three seconds and of minimal consequence when opening/closing the liftgate, other situations may demand a real time warning with a very minimal, if any, delay. This can occur, for example, when a seat dump switch is initiated and an electric motor positioned in a seat, for example, within a passenger compartment quickly drives the seat back forward. The alert in this instance needs to be immediate or the action of the motor and the seat may be partially or fully completed before the warning initiates.

Accordingly, a need exists for methods and related circuits for generating chimes or warnings utilizing existing hardware and without significant initiation delays and other of the aforementioned drawbacks.

SUMMARY OF THE INVENTION

In accordance with the purposes and benefits described herein, a method is provided of generating warnings associated with a vehicle. The method may be broadly described as comprising the steps of: receiving an indication that a warning relating to operation of an electric motor is appropriate; generating a drive current for the electric motor; superimposing a warning signal onto the drive current; and driving the electric motor with the drive current and the superimposed warning signal such that the electric motor produces the warnings.

In one possible embodiment, the warning signal is an audio signal. In another, the audio signal is between 20 Hz and 15 kHz.

In another possible embodiment, the method further includes the step of superimposing a second warning signal onto the drive current, wherein the warning signal produces an audible warning and the second warning signal produces a tactile warning.

In still another possible embodiment, the electric motor is positioned inside a passenger compartment.

In yet another possible embodiment, the indication that a warning relating to operation of an electric motor is appropriate is a change of state of a switch associated with the electric motor.

In one additional possible embodiment, a control module of the controller area network receives the indication, and subsequently initiates a step of generating the warning signal to be superimposed onto the drive signal.

In still another possible embodiment, the control module of the controller area network is connected to the switch associated with the electric motor.

In one possible embodiment, the switch is a seat dump switch and the electric motor is an electric recline motor mounted inside of the passenger compartment.

In another possible embodiment, the switch is a liftgate switch and the electric motor is an electric liftgate motor mounted outside of the passenger compartment.

Another possible method of generating warnings using an electric motor of a vehicle may be broadly described as comprising the steps of: receiving a signal indicating activation of the electric motor; generating an audio signal; combining the audio signal with a drive signal for the electric motor; and driving the electric motor with the combined drive signal and audio signal such that the electric motor produces an audible warning.

In one other possible embodiment, the combining step combines the audio signal and a non-audio signal with the drive signal for the electric motor such that the electric motor produces an audible warning and a tactile warning.

In still another possible embodiment, the electric motor is positioned inside a passenger compartment.

In yet another possible embodiment, a control module of the controller area network receives the signal indicating activation of the electric motor, and subsequently initiates the step of generating the audio signal to be combined with the drive signal. In another, the control module of the controller area network is connected to a switch associated with the electric motor.

In another possible embodiment, a circuit for generating warnings associated with operation of a motor of a vehicle may be broadly described as comprising a power source connected to a control circuit for generating a drive signal, an audio signal generator, an amplifier for superimposing a signal generated by said audio signal generator onto the drive signal, and a control module for receiving information from at least one switch and applying power from said power source via said control circuit to a motor for driving a component of the vehicle, wherein said motor is driven by the drive signal and the superimposed signal such that said motor generates the warnings.

In another possible embodiment, the control circuit is an H-bridge circuit.

In other possible embodiments, the circuits for generating warnings associated with operation of a motor of a vehicle described above are incorporated into a vehicle.

In the following description, there are shown and described several embodiments of a method of generating warnings associated with a vehicle and related circuits. As it should be realized, the methods and circuits are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle, circuits, and method and together with the description serve to explain certain principles thereof. In the drawing figures.

Reference will now be made in detail to the present preferred embodiments of the method of generating warnings associated with a vehicle and related circuits, examples of which are illustrated in the accompanying drawing figures, wherein like numerals are used to represent like elements.

DETAILED DESCRIPTION

Figure 1:
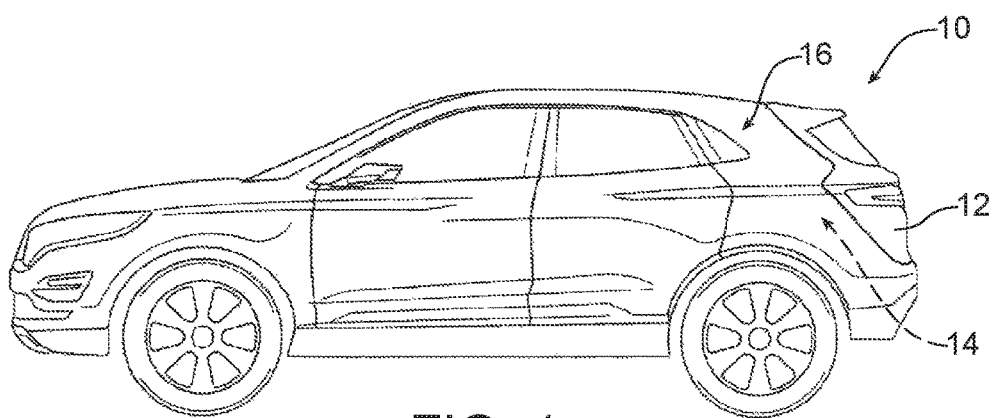
FIG. 1 is a side view of a vehicle.

Reference is now made to FIG. 1 which illustrates a vehicle 10. The vehicle 10 may be a hatchback, van, sports utility vehicle (SUV), a station wagon or the like in which a powered liftgate 12 is provided. The liftgate 12 is a rear door that provides access to a rear cargo area in the vehicle 10, such as a rear storage compartment 14. When closed, outer edges of the liftgate 12 abut a rearward-most pillar, or rear pillar 16. The rear pillar 16 can refer to a typical "D" pillar in a vehicle, but may refer to a "C" pillar or any rearward-most pillar in the vehicle 10. The rear pillar provides structural support to the vehicle 10, and can be filled with insulation such as foam to reduce noise, vibration, and/or provide more structural integrity to the vehicle 10.

Figure 2:
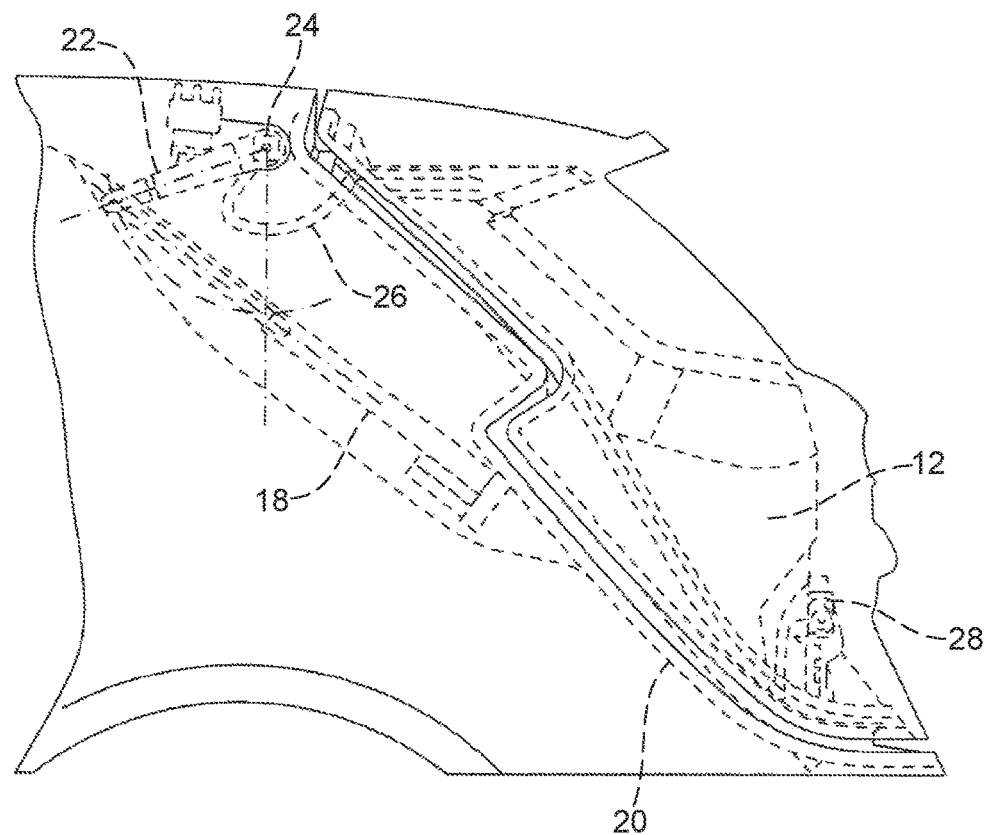
FIG. 2 is a side view of a powered liftgate and liftgate actuating mechanism of the vehicle in a closed position.

In one possible embodiment shown in FIG. 2, an arm 18 is provided for opening and closing the liftgate 12 through extension and retraction. The arm 18 can be in the form of any mechanism sufficient to extend and retract, even while subjected to high loads. For example, the arm 18 may be a threaded rod with a plunger in which a motor turns a nut or the like around the threaded rod to move the plunger linearly to extend and retract a portion of the arm 18. The arm 18 may also be a hydraulic arm, powered by a hydraulic pump with fluid lines connecting the arm 18 to the pump. Other mechanisms are known in the art to open and close the liftgate 12 including, for example, a power liftgate motor which directly rotates the hinge.

In the described embodiment, the arm 18 is connected at one end to a vehicle body 20. This connection point may be a rigid connection such as a welded connection which would not allow any angular movement of the arm 18. Alternatively, the arm 18 may be pivotally connected to the vehicle body 20 such that the arm 18 is permitted to pivot or rotate as the arm extends and retracts. The arm 18 is also pivotally connected at another end to a lever 22. The lever 22 extends generally perpendicular to a longitudinal crossbar 24 that extends across the width of the vehicle 10. The crossbar 24 is secured to an upper portion of the liftgate 12 via a bracket 26, which translates rotational movement of the crossbar 24 into an opening and closing of the liftgate 12. Further detail concerning the described liftgate is described in U.S. Pat. No. 8,845,006, the disclosure of which is incorporated herein by reference.

In a closed position shown in FIG. 2, the liftgate 12 is secured to the vehicle body 20 via a latch or lock (not shown). In this position, the arm 18 is fully extended and the lever 22 is in an upward-most rotational position. When the arm 18 is fully extended, the lever 22 of the crossbar 24 is positioned such that the bracket 26 maintains the liftgate 12 in the closed position.

When the liftgate 12 is desired to be open, a drive signal is provided to a power supply 28 that provides power to the arm 18 in order to retract and extend the arm 18 which, in the described embodiment, rotates the lever 22 counter-clockwise. The rotation of the lever 22 rotates the crossbar 24, which in turn causes the attached bracket 26 to rotate in the same direction, thereby causing the liftgate 12 to open.

Examples of the power supply 28 include an electric motor, a hydraulic pump with fluid lines, or a power cable drive. Other embodiments of the power supply mechanism are known in the art to actuate the arm 18. The power supply 28 can also be electrically connected to a controller and a computer within the vehicle that actuates the liftgate 12. The power supply 28 may be located inside or outside of a passenger compartment, essentially anywhere in the vehicle 10, including near the rear floor of the storage compartment 14 or adjacent to the arm 18.

Figure 3:
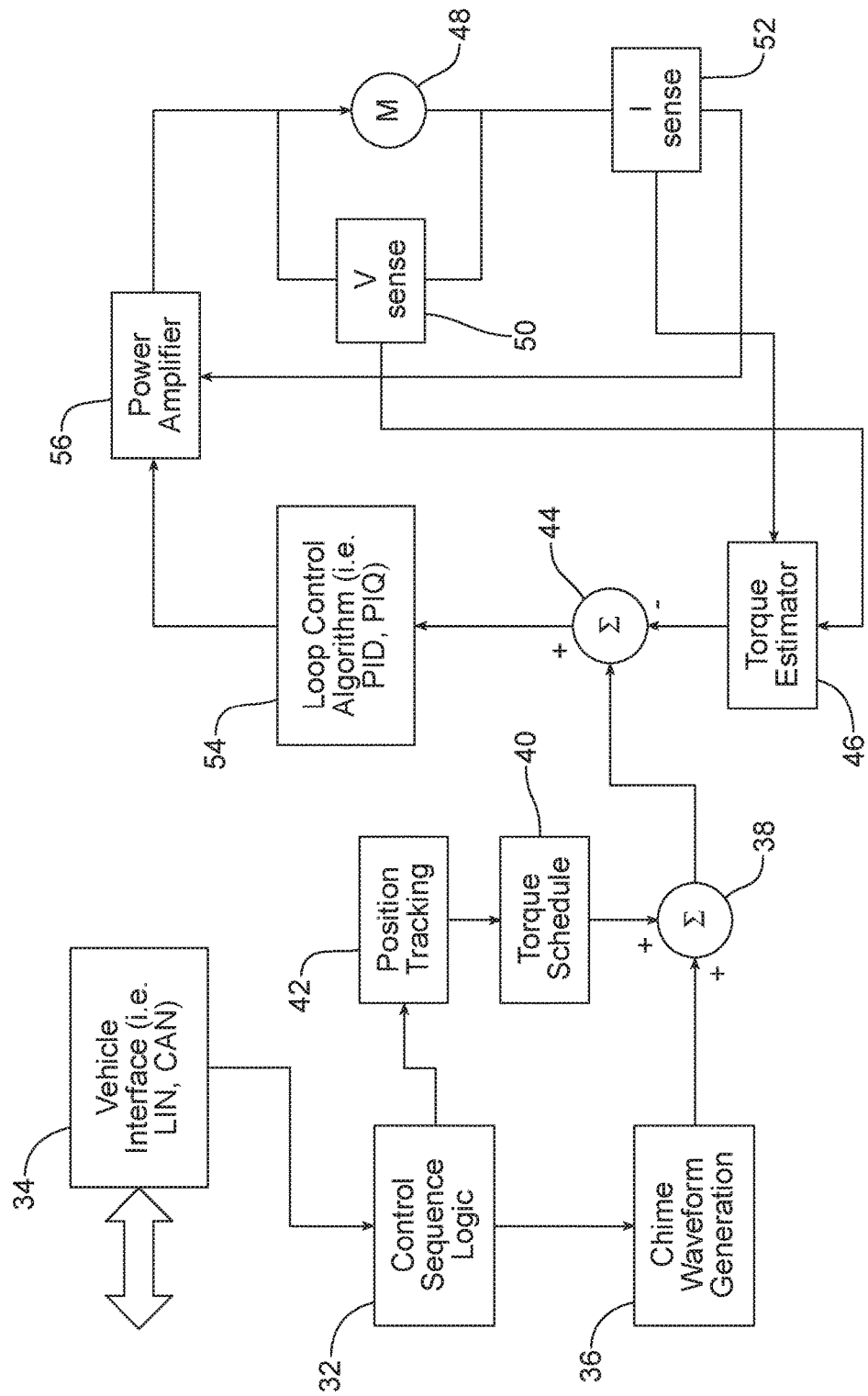
FIG. 3 is a block diagram of an exemplary circuit including a control module for generating warnings associated with a vehicle.

FIG. 3 is a schematic diagram of an exemplary circuit 30, including a control module 32, for generating warnings associated with the vehicle 10. As shown, the control module 32 includes a memory 34 wherein a liftgate motor control logic 36, or program, is stored, and an internal timer. The control logic 36 manages the opening and closing cycles of the liftgate 12, including timing of the warning signal actuation and torque initiation. The control module 32 in the described embodiment is a liftgate control module which may be a pulse width modulation controller.

In the exemplary circuit 30, the control module 32 receives an indication that a warning relating to operation of an electric motor 48 is appropriate. The indication is in the form of a change of state of a switch associated with an electric motor. In the described embodiment, the indication is in the form of information relating to commands concerning operation of the liftgate 12 (e.g., initiate liftgate cycling). Such commands may be provided to the control module 32 by any one or more switches (not shown) either directly or through one or more control modules utilizing an internal communications network 34 (e.g., a controller area network (CAN) or local interconnect network (LIN)) that interconnects components inside the vehicle 10. In the embodiment shown in FIG. 3, the information is provided indirectly via the controller area network 34. Other embodiments may utilize direct or indirect connections to a dash or door mounted switch, a foot activated switch, key fob switch, or other vehicle interface.

As shown, the described circuit 30 includes a waveform generator 36 controlled by the control module 32. The waveform generator 36 generates a sequence of waveform samples representing a desired sound pressure, i.e., an AC torque value. Although the waveform generator 36 creates digital waveform samples in the described embodiment, an analog waveform generator may be utilized in other embodiments to produce an analog waveform representing the desired sound pressure.

The AC torque value generated by the waveform generator 36 provides a first input for a summing amplifier 38 and represents a warning signal. The summing amplifier 38 combines the AC torque value with a second input, i.e., a desired DC torque value. In other words, the AC torque value or warning signal is superimposed onto the desired DC torque value or drive current for the electric motor. In the described embodiment, the warning signal is an audio signal between 20 Hz and 15 kHz. In alternate embodiments, more than one warning signal may be utilized. For instance, the warning signal may include an audio warning signal that produces an audible warning, as described above, and a second, non-audio, warning signal that produces a tactile warning.

The desired DC torque value is generated by a torque command lookup table 40 stored in control module memory 34 and is dependent upon a position of the liftgate 12. The position of the liftgate 12 is approximated in the described embodiment through liftgate cycle timing 42 as is known in the art. Alternatively, the position of the liftgate 12 may be determined more directly using a tachometer or the like.

The summed AC torque and desired DC torque value is further summed with a current or actual DC torque value in summing amplifier 44. The current DC torque value is computed by a torque estimator 46 and is based on an instantaneous state of motor 48 as provided by a voltage feedback loop 50 and/or a current feedback loop 52. In the described embodiment, motor 48 is a permanent magnet DC motor to provide the desired speed control but other types of motors (e.g., a brushless DC motor or n-phase motor) could also be utilized. Both motor voltage and motor current feedbacks are smoothed using low pass filtering to reduce or eliminate transients from amplifier 56 or motor commutation pulses. Depending on motor type, one or both of the voltage feedback loop 50 and/or current feedback loop 52 may be required to be a multi-phase circuit.

The output of summing amplifier 44, i.e., the difference between the summed AC torque and desired DC torque value and the current DC torque value, is provided to a linear feedback controller 54. In the described embodiment, the linear feedback controller 54 is a proportional-integral-derivative (PID) controller that minimizes any error between the summed AC torque and desired DC torque value and the actual or current DC torque value. If the sum is zero, then no error is indicated and no adjustment is made. If the sum is non-zero, however, the linear feedback controller 54 acts to adjust the instantaneous motor drive level. In general, error minimization may be implemented by a tunable proportional-integral-derivative control strategy, but other forms such as proportional, integral, quadrature (PIQ) or non-linear controller models may be utilized.

Figure 4:
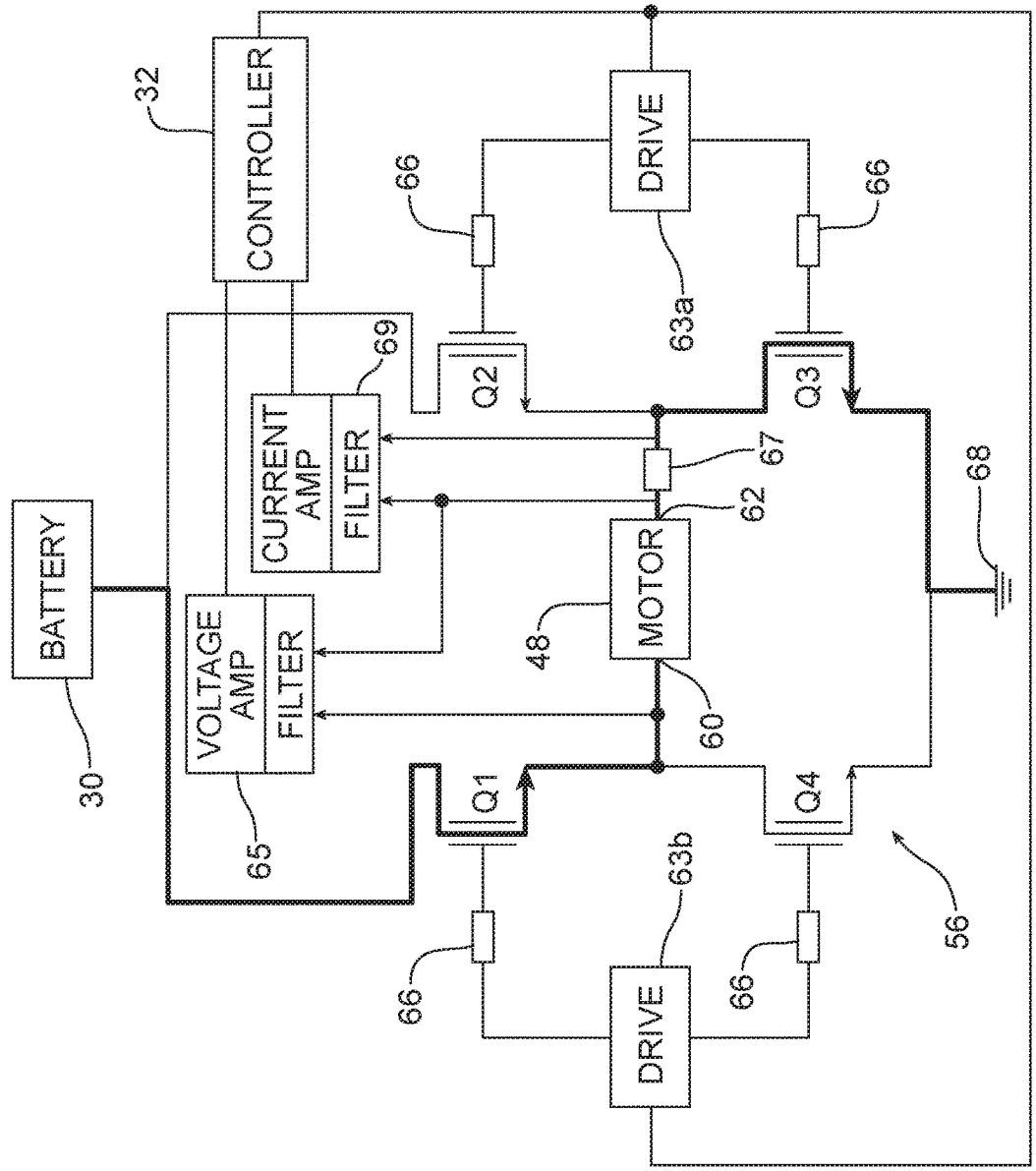
FIG. 4 is a schematic of an H-bridge control circuit.

Power from a battery 30 (e.g., +/−12 volts) or other power source is provided to the motor 48 via a power amplifier 56. In the described embodiment, the power amplifier 56 is an H-bridge circuit that enables a voltage to be applied across a load in either direction. An exemplary H-bridge circuit is shown in FIG. 4. As is known in the art, H-bridge circuits are commonly used to allow DC motors to run forwards and backwards, i.e., to reverse the polarity/direction of the motor. In the described embodiment, the H-bridge circuit 56 is a solid-state circuit although switches, relays, transistors, or MOSFETs may be utilized in other embodiments. Other control circuit types may be used as well to reverse direction of the motor. Although not shown in the exemplary H-bridge circuit, protection may be added including, for example, Schottky diodes and/or filtering capacitors to absorb voltage spikes from the motor. Even more, bridge driver chips 63 are utilized to drive the circuit rather than interfacing directly with the control module 32 or controller. In the described embodiment, the driver chips are International Rectifier part number IR2104(S) which are high voltage, high speed power MOSFET and IGBT drivers with dependent high and low side referenced output channels.

The described H-bridge circuit 56 includes four switching elements, namely, N-channel FETs Q1, Q2, Q3, and Q4. As suggested above, bi-polar or other types of transistors may be utilized. The top-end of the H-bridge circuit 56 is connected to the battery 30 and the bottom-end is grounded at ground 68. In general, all four switching elements Q1-Q4 can be turned on and off independently though there are some restrictions. The liftgate motor 48 is connected at a first lead 60 between transistors Q1 and Q4. A voltage amplifier/low pass filter 65 provides feedback to the control module 32 and receives signals from the first lead 60 and a second lead 62. The liftgate motor 48 is further connected at the second lead 62 to resistor 67 (a 0.1 ohm resistor in the described embodiment) which is further connected between Q2 and Q3. The second lead 62 is further connected to a current amplifier/low pass filter 69 which itself is further connected between Q2 and Q3 and the resistor 67 and provides feedback to the control module 32.

The basic operating mode of an H-bridge circuit is straightforward. Control signals are provided to the H-bridge circuit 56 via bridge driver chips 63a and 63b and 10 ohm resistors 66 in the described embodiment. When the control signal from bridge driver chip 63a is high and control signal from driver chip 63b is low, transistors Q1 and Q3 are turned on. As shown in FIG. 4, the left lead 60 of the wiper motor 48 will be connected to the battery 30 via transistor Q1, while the right lead 62 is connected to ground 68 via transistor Q3. Current starts flowing through the motor 48 which energizes the motor in the forward direction and the motor shaft starts rotating for opening the liftgate 12. If transistors Q2 and Q3 are turned on by bringing control signals from bridge driver chip 63a low and control signals from bridge driver chip 63b high, the reverse will happen and the motor 48 is energized in the reverse direction and the shaft will start rotating in the opposite direction for closing the liftgate 12.

In addition to the circuit shown in FIG. 3, additional methods/circuits may be utilized to couple a warning signal (e.g., an AC sound/vibration signal) into the motor/drive system. As shown in basic form in FIGS. 5A-5C, for example, these additional methods/circuits may utilize inductive coupling, capacitive coupling, or hybrid coupling methods respectively.

Figure 5A:
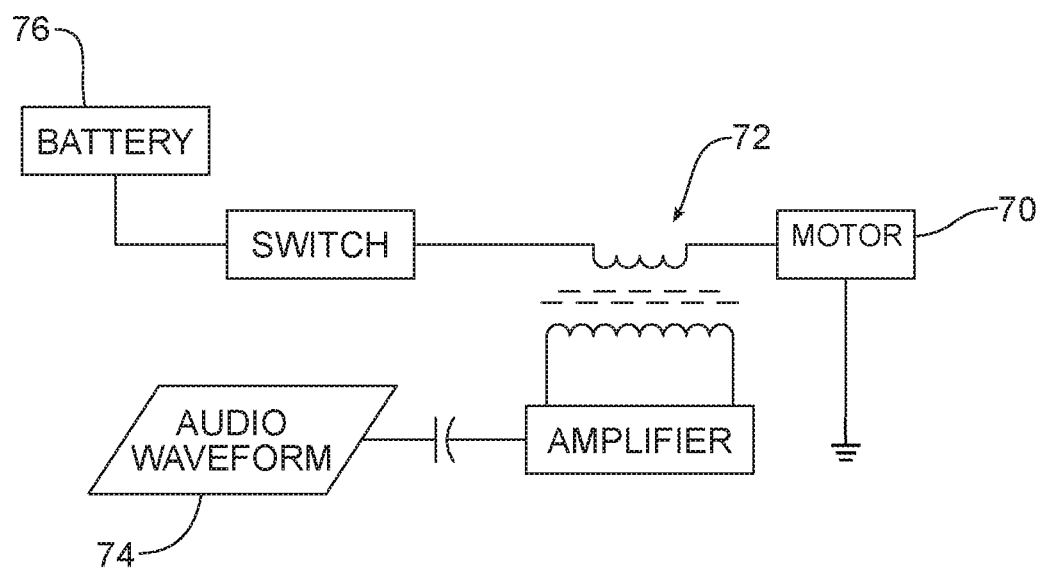
FIG. 5A is a block diagram of a first alternate embodiment of an exemplary circuit for generating warnings.
Figure 5B:
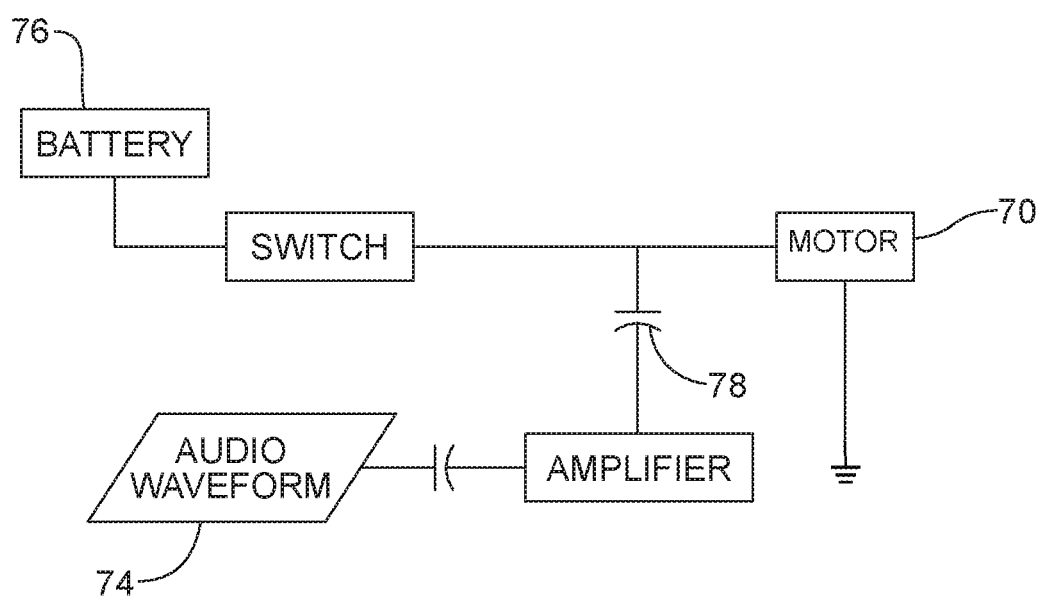
FIG. 5B is a block diagram of a second alternate embodiment of an exemplary circuit for generating warnings.
Figure 5C:
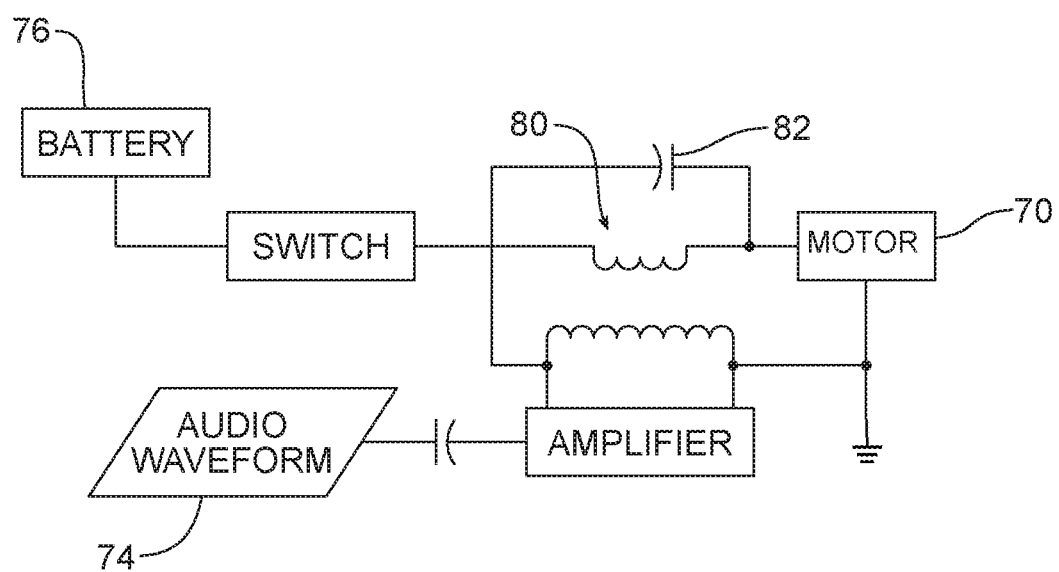
FIG. 5C is a block diagram of a third alternate embodiment of an exemplary circuit for generating warnings.

In an embodiment where the motor is associated with a cooling fan 70, as shown in FIG. 5A, a transformer 72 couples an AC audio signal 74 in as a varying current with a switched voltage from a battery 76 or existing DC controller. Such an embodiment may be applicable for systems using either a pulse width modulation controller or simple ON/OFF relay schemes. Similarly, as shown in FIG. 5B, a capacitor 78 may be used to couple the AC audio signal 74 in as a varying current with the voltage from the battery 76 or existing DC controller. Again, such an embodiment may be applicable for systems using either a pulse width modulation controller or simple ON/OFF relay schemes. It should be noted that an open circuit is required in such an arrangement when the fan 70 is OFF in order to generate sound. FIG. 5C illustrates an exemplary hybrid arrangement for a cooling fan 70. In this embodiment, a transformer 80 couples the AC audio signal 74 in as a varying current with the voltage from the battery 76 or existing DC controller, and a capacitor 82 couples the AC audio signal 74 when the controller is open circuited. This hybrid embodiment may be added to any existing architecture. Each of these embodiments may be utilized with motors other than a fan motor, for example, a traction motor or any motor utilized in the vehicle.

In summary, numerous benefits result from the method of generating warnings associated with a vehicle as illustrated in this document. The method is capable of generating warnings upon receiving an indication that such a warning is appropriate by superimposing a warning signal onto a drive current for an electric motor such that the electric motor produces the warnings during operation. In one alternate embodiment, the electric motor may be an electric recline motor positioned in a seat in the passenger compartment for driving a seat back in response to initiation of a seat dump switch. The alert in this instance needs to be immediate or the action of the motor and the seat may be partially or fully completed before the warning initiates. The foregoing has been presented for purposes of illustration and description. It is not intended to be exhaustive or to limit the embodiments to the precise form disclosed. Obvious modifications and variations are possible in light of the above teachings.

For example, the described power supply may be a motor drive interposed between a liftgate and a portion of the vehicle body's D-pillar or rearmost pillar as is known in the art and described in U.S. Pat. No. 7,547,058, the disclosure of which is incorporated herein by reference. In such an embodiment, a controller or control module may be connected to the motor as well as a load cell and encoder for monitoring a location of the liftgate. Since the motor drives a lead screw via a spring cable, placement of the motor may be varied and may be outside of the D-pillar. In addition, the power amplifier may be implemented digitally as described above with regard to the H-bridge circuit or may be a linear power amplifier. Depending on the motor type, the amplifier may be required to be a multi-phase amplifier. All such modifications and variations are within the scope of the appended claims when interpreted in accordance with the breadth to which they are fairly, legally and equitably entitled.

What is claimed:

1. A method of generating warnings using an electric motor of a vehicle, comprising the steps of:
   receiving a signal indicating activation of said electric motor;
   generating an audio signal;
   combining the audio signal with a drive signal for said electric motor, wherein the combining step combines the audio signal and a non-audio signal with the drive signal for said electric motor; and
   driving said electric motor with said combined drive signal and audio signal such that said electric motor produces an audible warning and a tactile warning.

2. The method of generating warnings using an electric motor of a vehicle of claim 1, wherein the audio signal is between 20 Hz and 15 kHz.

3. The method of generating warnings using an electric motor of a vehicle of claim 1, wherein said electric motor is positioned inside a passenger compartment.

4. The method of generating warnings using an electric motor of a vehicle of claim 1, wherein a control module of a controller area network receives the signal indicating activation of said electric motor, and subsequently initiates the step of generating the audio signal to be combined with the drive signal.

5. The method of generating warnings using an electric motor of a vehicle of claim 4, wherein said control module of said controller area network is connected to a switch associated with said electric motor.

6. The method of generating warnings using an electric motor of a vehicle of claim 5, wherein said switch is a seat dump switch and said electric motor is an electric recline motor.

7. The method of generating warnings using an electric motor of a vehicle of claim 5, wherein said switch is a liftgate switch and said electric motor is an electric liftgate motor.

* * * * *